(12) United States Patent
Kelly et al.

(10) Patent No.: US 12,135,975 B2
(45) Date of Patent: *Nov. 5, 2024

(54) DYNAMICALLY-CONFIGURABLE BASEBOARD MANAGEMENT CONTROLLER

(71) Applicant: Microsoft Technology Licensing, LLC, Redmond, WA (US)

(72) Inventors: Bryan D. Kelly, Carnation, WA (US); Neeraj Ladkani, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,062

(22) Filed: Jun. 5, 2023

(65) Prior Publication Data

US 2023/0315490 A1    Oct. 5, 2023

Related U.S. Application Data

(63) Continuation of application No. 17/854,137, filed on Jun. 30, 2022, now Pat. No. 11,714,661, which is a
(Continued)

(51) Int. Cl.
*G06F 9/44* (2018.01)
*G06F 9/445* (2018.01)

(52) U.S. Cl.
CPC ................ *G06F 9/44505* (2013.01)

(58) Field of Classification Search
CPC .................... G06F 1/32; G06F 9/44
See application file for complete search history.

(56) References Cited

U.S. PATENT DOCUMENTS

2008/0256350 A1    10/2008  Hattori
2009/0259782 A1    10/2009  Luo
(Continued)

FOREIGN PATENT DOCUMENTS

CN        107924698 A       4/2018

OTHER PUBLICATIONS

Notice of Grant received in Chinese Application No. 202080034001. 1, mailed on Jan. 6, 2024, 5 pages. (English Translation Provided).
(Continued)

*Primary Examiner* — Keshab R Pandey
(74) *Attorney, Agent, or Firm* — Weaver IP L.L.C.

(57) ABSTRACT

Methods, systems, apparatuses, and computer-readable storage mediums described herein are configured to dynamically configure a baseboard management controller to monitor a state of a server. For example, a configuration schema may be provided to the baseboard management controller. The configuration schema specifies each of the devices of the server that is to be monitored by the baseboard management controller. The configuration schema also specifies additional configuration details with respect to each of the devices. Based on the configuration information included in the configuration schema, the baseboard management controller performs a discovery sequence with respect to each of the devices to verify that such devices are communicatively coupled to the baseboard management controller. If the discovery sequence is successful, the baseboard management controller begins monitoring the devices. However, if the discovery sequence is unsuccessful, the baseboard management controller issues an error, thereby enabling the proper personnel to remediate the issue.

21 Claims, 6 Drawing Sheets

Related U.S. Application Data continuation of application No. 16/405,441, filed on May 7, 2019, now Pat. No. 11,409,544.

(56) References Cited

U.S. PATENT DOCUMENTS

| | | | |
|---|---|---|---|
| 2018/0081849 A1* | 3/2018 | Remis | G06F 13/4022 |
| 2018/0365422 A1 | 12/2018 | Callaghan et al. | |
| 2020/0076690 A1* | 3/2020 | Alvarez Jana | H04L 41/0813 |

OTHER PUBLICATIONS

"Office Action Issued in Chinese Patent Application No. 202080034001. 1", Mailed Date: Sep. 13, 2023, 11 Pages.
"Office Action Issued in European Patent Application No. 20722139. 1", Mailed Date: Aug. 10, 2023, 6 Pages.
Communication pursuant to Article 71(3) EPC, Received for European Application No. 20722139.1, mailed on Jul. 10, 2024, 7 pages.
Office Action Received for Indian Application No. 202147045321, mailed on Feb. 2, 2024, 8 pages.
U.S. Appl. No. 16/405,441, filed May 7, 2019.

\* cited by examiner

DYNAMICALLY-CONFIGURABLE BASEBOARD MANAGEMENT CONTROLLER

CROSS-REFERENCE TO RELATED APPLICATIONS

This application is a continuation of pending U.S. patent application Ser. No. 17/854,137, filed on Jun. 30, 2022, entitled "Dynamically-Configurable Baseboard Management Controller," which is a continuation of U.S. patent application Ser. No. 16/405,441, filed on May 7, 2019, entitled "Dynamically-Configurable Baseboard Management Controller," now U.S. Pat. No. 11,409,544, granted on Aug. 9, 2022, the entirety of each of which is incorporated by reference herein.

BACKGROUND

Baseboard management controllers are typically implemented as a system-on-a-chip (SoC) mounted on a server motherboard. They are responsible for monitoring the health of the server and controlling certain devices coupled to the motherboard, such as fans to cool the server motherboard. The expansion of cloud server hardware has seen an increase of devices being plugged into the server motherboard. Some of these are not discoverable by baseboard management controllers. As such, certain configuration data associated with these devices, such as address information and device properties, are hard coded into the firmware of the baseboard management controller. This is not much of an issue where the number of server configurations are limited. However, cloud providers maintain numerous custom configurations of servers that are tailored for the specific need of their customers. Cloud providers may maintain hundreds or even thousands of such custom-configured servers, each of which require a baseboard management controller that maintains hardcoded firmware that is based on the server's unique device configuration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to dynamically configure a baseboard management controller to monitor a state of a computing device (e.g., a server). For example, a configuration schema may be provided to the baseboard management controller. The configuration schema specifies each of the devices of the computing device that is to be monitored by the baseboard management controller. The configuration schema also specifies additional configuration details with respect to each of the devices. Based on the configuration information included in the configuration schema, the baseboard management controller performs a discovery sequence with respect to each of the devices to verify that such devices are communicatively coupled to the baseboard management controller. If the discovery sequence is successful, the baseboard management controller begins monitoring the devices. However, if the discovery sequence is unsuccessful, the baseboard management controller issues an error, thereby enabling the proper personnel to remediate the issue (e.g., updating the configuration schema).

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
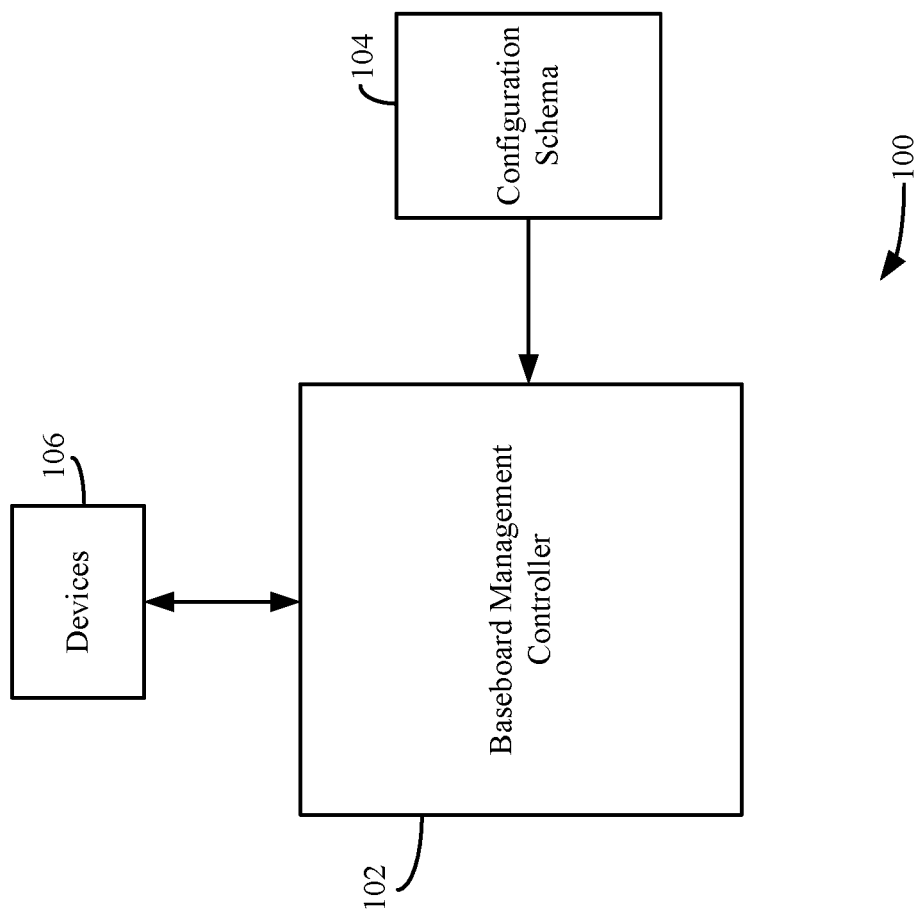
FIG. 1 shows a block diagram of an example system for configuring a baseboard management controller to monitor a plurality of devices in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein dynamically configure a baseboard management controller to monitor a state of a computing device (e.g., a server). For example, a configuration schema may be provided to the baseboard management controller. The configuration schema specifies each of the devices of the computing device that is to be monitored by the baseboard management controller. The configuration schema also specifies additional configuration details with respect to each of the devices. Based on the configuration information included in the configuration schema, the baseboard management controller performs a discovery sequence with respect to each of the devices to verify that such devices are communicatively coupled to the baseboard management controller. If the discovery sequence is successful, the baseboard management controller begins monitoring the devices. However, if the discovery sequence is unsuccessful, the baseboard management controller issues an error, thereby enabling the proper personnel to remediate the issue (e.g., updating the configuration schema).

The foregoing provides several advantages. For instance, the firmware of the baseboard management controller no longer needs to be statically hardcoded with values specifying the devices coupled thereto and the properties thereof. Instead, the baseboard management controller simply needs to process the configuration schema and dynamically configure the baseboard management controller via the discovery sequence. In the event that a device of the computing device is changed or removed, an updated configuration schema reflecting the changed configuration is provided to the baseboard management controller, which then performs the discovery sequence in accordance with the updated configuration schema. In prior solutions, such a change in configuration would require a firmware update, where the firmware would be rewritten with new hardcoded values to reflect the new device configuration. Such firmware updates require a lengthy validation cycle to ensure that the firmware does not cause the baseboard management controller to malfunction. The foregoing techniques virtually remove this validation cycle, as the firmware is not manually rewritten, but instead, is updated via the configuration schema-driven discovery sequence.

FIG. 1 shows a block diagram of an example system 100 for configuring a baseboard management controller 102 to monitor a plurality of devices 106 in accordance with an example embodiment. As shown in FIG. 1, system 100 includes baseboard management controller 102 and plurality of devices 106. Baseboard management controller 102 may be configured to monitor the state of a computer, server, and/or other hardware device in which baseboard management controller 102 is included. Baseboard management controller 102 may be included on a motherboard, baseboard, or main circuit board of the device to be monitored. Baseboard management controller 102 may be implemented as a system-on-a-chip (SoC), an application-specific integrated circuit (ASIC), a microcontroller, etc.

Baseboard management controller 102 may be implemented in a system that implements an IPMI (Intelligent Platform Management Interface) computer interface specification, or other system, to provide management and monitoring capabilities independent of a host system's CPU (central processing unit), firmware (e.g., BIOS (Basic Input/Output System) or UEFI (Unified Extensible Firmware Interface)), and operating system). For instance, baseboard management controller 102 may be a microcontroller or other processor type embedded on the motherboard of a computer, and may be configured to manage the interface between system management software and platform hardware. For example, as further described elsewhere herein, sensors built into the computer may report to baseboard management controller 102 on parameters such as temperature, cooling fan speeds, power status, operating system (OS) status, etc. Baseboard management controller 102 monitors the sensors and can send alerts to a system administrator via a network connection if any parameters do not stay within pre-set limits, indicating a potential failure of the computer. The administrator may be enabled to remotely communicate with baseboard management controller 102 to take corrective actions, such as resetting or power cycling the computer to get a hung OS running again. These abilities can save on the total cost of ownership of a computer.

To monitor the state of a computing device, baseboard management controller 102 may monitor a plurality of devices (e.g., devices 106) of the computing device. For instance, a given computing device (e.g., a server) may include any number of devices that may be coupled to the main circuit board (or motherboard) on which baseboard management controller 102 is attached and/or on a different circuit board coupled to the main circuit board (e.g., via one or more expansion slots, cables, connectors, etc.). Examples of devices 106 include, but are not limited to, power supply units, fans, temperature sensors, humidity sensors, memories (e.g., random access memories (RAM), such, static RAMs (SRAMs), dynamic RAMs (DRAMs), etc.), storage devices (e.g., hard disk drives, solid state drives, etc.), central processing units (CPUs), hardware accelerators, video cards, sound cards, storage controllers, network controllers, other peripheral devices (such as, but not limited to. PCI-Express-based peripheral devices), etc. Given that a particular computing device, such as a server, may comprise racks and racks of hardware devices, the total number of devices 106 to be monitored can be anywhere from the hundreds to even the thousands.

To configure baseboard management controller 102 to monitor such devices 106, baseboard management controller 102 may be provided a configuration schema 104. Configuration schema 104 specify the devices (e.g., devices 106) that are to be included in the computing device being monitored by and coupled to baseboard management controller 102. Configuration schema 104 may comprise information (e.g., metadata) that specifies the configuration of the computing device being monitored. For example, configuration schema 104 may identify each of devices 106, and may specify a logical address at which each of devices 106 is located, a physical address at which each of devices 106 is located (e.g., expansion slot 1 of rack 4), a logical address of one or more configuration registers associated with each of devices 106, an expected value for each of such configuration register(s), a communication protocol utilized by each of devices 106, etc. Configuration schema 104 may comprise one or more user-generated files and/or one or more automatically-generated files (e.g., via a graphical user interface in which a user, such as an administrator, specifies values for the above-described information and that automatically generates configuration schema 104 based on the specified values). In accordance with an embodiment, configuration schema 104 may be formatted in accordance with a JavaScript Object Notation (JSON) format, an Extensible Markup Language (XML) format, or any other format suitable for organizing and/or transmitting data.

Using configuration schema 104, baseboard management controller 102 may perform an automated discovery sequence to discover each of devices 106 and verify that each of devices 106 are included in the computing device being monitored. Upon verifying that each of devices 106 are included in the computing device, baseboard management controller 102 may accept configuration schema 104 as the configuration for the computing device and monitor devices 106 (e.g., the fan speeds, temperature, humidity, power consumption, etc., of devices 106). Upon successful verification, configuration schema 104 may also be utilized on any other similarly configured computing device. Upon determining that at least one of devices 106 is not included in the computing device or is exhibiting unintended behavior, baseboard management controller 102 may provide an error signal to notify an administrator of the issue. The administrator can then take the necessary corrective action to remediate the issue. Additional details regarding baseboard management controller 102 is described below with reference to FIG. 2.

Figure 2:
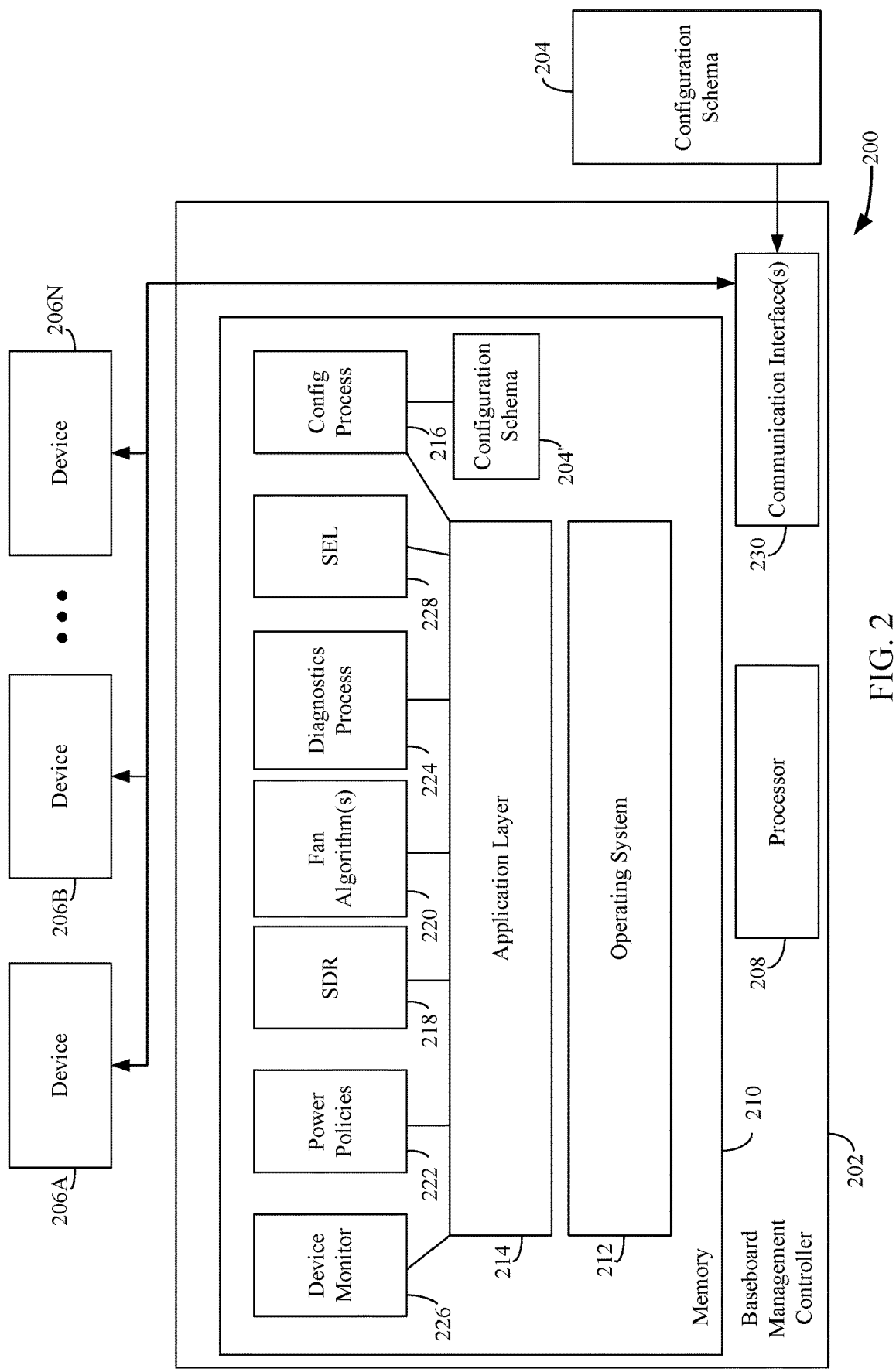
FIG. 2 shows a block diagram of an example system for configuring a baseboard management controller to monitor a plurality of devices in accordance with another example embodiment.

FIG. 2 shows a block diagram of an example system 200 for configuring a baseboard management controller 202 to monitor a plurality of devices 206A-206N in accordance with another example embodiment. As shown in FIG. 2, system 200 includes baseboard management controller 202 and plurality of devices 206A-206N, where N is any positive integer. Baseboard management controller 202 is an example of baseboard management controller 102, and devices 206A-206N are examples of devices 106, as described above with reference to FIG. 1. Baseboard management controller 202 comprises a processor 208, a memory 210, and one or more communication interfaces 230. As further shown in FIG. 2, memory 210 may store an operating system 212, an application layer 214, a configuration process 216, a sensor data record (SDR) 218, one or more fan algorithms 220, one or more power policies 222, a diagnostics process 224, a device monitor 226, and a system event log (SEL) 228. Examples of memory 210 include, but are not limited to, a non-volatile memory device (e.g., flash memory, ferroelectric RAM, an electrically erasable programmable read-only memory (EEPROM), and/or the like), a volatile memory device (e.g., DRAMs, SRAMs, and/or the like), etc.

In some embodiments, processor 208 may be configured to execute multiple computing threads, computing programs, and/or applications stored in memory 210 (e.g., operating system 212, application layer 214, fan algorithm(s) 220, power policies 222, diagnostics process 224, device monitor 226, configuration process 216, etc. In some embodiments, processor 208 may each comprise one or more processor core(s).

Operating system 212 may be configured to manage one or more hardware components (e.g., processor 208, memory 210, communication interface(s) 230, etc.) and software executing on baseboard management controller 202 (e.g., application layer 214, fan algorithm(s) 220, power policies 222, diagnostics process 224, device monitor 226, configuration process 216, etc.).

Application layer 214 may be an abstraction layer that interfaces operating system 212 and/or devices 206A-206N with configuration process 216, diagnostics process 224, and/or device monitor 226 via communication interface(s) 230. Communication interface(s) 230 may comprise interface(s) suitable for receiving configuration schema 204. Examples of such interfaces include, but are not limited to, a local area network (LAN) interface, a low pin count (LPC) interface, and an I2C (Inter-Integrated Circuit) interface. An I2C interface interfaces with an I2C serial computer bus used for attaching lower-speed peripheral integrated circuits (ICs) to processors and microcontrollers in short-distance, intra-board communication. An I2C bus is synchronous, multi-master, multi-slave, packet switched, and single-ended, as is well-known to persons skilled in the relevant art(s). Communication interface(s) 230 may also comprise interface(s) suitable for communicating with devices 206A-206N. Examples of such interfaces include, but are not limited to, a system management bus (SMBus) interface, a power management bus (PMBus) interface, an I2C bus interface, a management component transport protocol (MCTP)-based bus interface, and/or the like.

Configuration schema 204 may be an example of configuration schema 104, as described above with reference to FIG. 1. Configuration schema 204 may specify the devices (e.g., devices 206A-206N) that are to be included in the computing device being monitored by and coupled to baseboard management controller 202. Configuration schema 204 may comprise information (e.g., metadata) that specifies the configuration of the computing device being monitored. For example, configuration schema 204 may identify each of devices 206 (e.g., via an identifier that identifies each of devices 206), specifies a logical address at which each of devices 206A-206N is located, a physical address at which each of devices 206A-206N is located (e.g., expansion slot 1 of rack 4), a logical address of one or more configuration registers associated with each of devices 206A-206N, an expected value for each of such configuration register(s), a communication protocol utilized by each of devices 206A-206N, etc. In accordance with an embodiment, configuration schema 204 may be formatted in accordance with a JavaScript Object Notation format, an Extensible Markup Language (XML) format, or any other format suitable for organizing and/or transmitting data.

Configuration schema 204 may be provided to baseboard management controller 202 via communication interface(s) 230. For example, a computing device (e.g., a computer, laptop, tablet, etc.) storing configuration schema 204 may be coupled to baseboard management controller 202 via communication interface(s) 230. The computing device may transfer configuration schema 204 to baseboard management controller 202 via communication interface(s) 230. Configuration schema 204 may be stored in memory 210 of baseboard management controller 202 (shown as configuration schema 204').

After storing configuration schema 204', application layer 214 may initiate configuration process 216. Configuration process 216 may be configured to validate configuration schema 204'. For instance, configuration schema 204' may be digitally signed. The digital signature may be based on a hash computed for configuration schema 204' that is encrypted using a private key of the entity that generated configuration schema 204. A public key associated with the entity may be provided to baseboard management controller 202 along with configuration schema 204. Configuration process 216 may be configured to decrypt the hash using the public key and also computes its own hash for configuration schema 204'. If that hash value matches the decrypted hash value, configuration process 216 may determine that configuration schema 204' is valid. If the hash values do not match, configuration process 216 may cause an error signal to be issued and/or an error to be logged in system event log 228, thereby informing a user of an invalid configuration schema 204'. The foregoing process advantageously prevents unauthorized configuration schemas from tampering with the configuration of baseboard management controller 202.

Configuration process 216 may also be configured to determine whether configuration schema 204' is formatted correctly. For instance, configuration process 216 may be configured to determine whether configuration process 216 is formatted in accordance with a predetermined formatting scheme (e.g., JSON, XML, etc.). For example, configuration process 216 may determine whether configuration schema 204' utilizes the proper syntax and/or structure (e.g., ensuring that a JSON object is encapsulated using an opening brace '{' and a closing brace '}', ensuring that key value pairs are separated by a comma ',', etc.). If configuration process 216 determines that configuration schema 204' is not formatted correctly, configuration process 216 may cause an error signal to be issued and/or an error to be logged in system event log 228, thereby informing a user of an invalid configuration schema 204'.

After validating configuration schema 204' and determining that it is formatted correctly, configuration process 216 may be configured to read configuration schema 204' and determine each of the devices (e.g., devices 206A-206N) that are to be monitored by baseboard management controller 202 and perform a discovery sequence to verify that such devices are coupled to baseboard management controller 202. For example, configuration process 216 may cause processor 208 to issue a request (or "ping") to each of devices 206A-206N specified by configuration schema 204' and to wait for a response from each of devices 206A-206N via communication interface(s) 230. The request may be transmitted in accordance with the communication protocol utilized by the device, as specified by configuration schema 204'. If no response is received, baseboard management controller 202 may provide an error signal and/or log an event in system error log 228 to notify an administrator of the issue. The administrator can then take the necessary corrective action to remediate the issue. For instance, configuration schema 204' may incorrectly identify a particular device of device 206A-206N. Accordingly, the administrator may update configuration schema 204 and provide the updated schema to baseboard management controller 202.

Upon receiving a response from a particular device, configuration process 216 reads configuration registers associated with that device, as specified by configuration schema 204'. The address at which the configuration registers are located are also specified by configuration schema 204'. Accordingly, configuration process 216 causes processor 208 to issue a read request to such addresses. Configuration schema 204' may also specify expected values for such registers. Configuration process 216 may compare the content read from the configuration registers to the expected values. If the content matches the values, configuration process 216 may determine that the associated device is coupled to baseboard management controller 202. If each of devices 206A-206N provides a response and the contents for the configuration registers of each device matches their respective expected values, baseboard management controller 202 may accept configuration schema 204' as the configuration for the computing device. Upon successful verification, configuration schema 204' may also be utilized on any other similarly configured computing device. Moreover, entities external to baseboard management controller 202 may query baseboard management controller 202 (e.g., via communication interface(s) 230) to obtain configuration schema 204'. Such entities include, but are not limited to a rack manager, a chassis manager, a data center manager, etc. Such entities may use configuration schema 204' to determine the computing device's configuration.

If the content does not match, configuration process 216 may determine that the device is not coupled to baseboard management controller 202 and/or the device is defective. In this case, baseboard management controller 202 may provide an error signal to notify an administrator of the issue. The administrator can then take the necessary corrective action to remediate the issue. For instance, the administrator may update configuration schema 204 with the correct configuration and provide the updated schema to baseboard management controller 202.

The content read from a particular device's configuration registers may correspond to properties of the device. For instance, the content may specify an identifier of the device (e.g., device name, model number, serial number, etc.), one or more parameters of the device (e.g., fan speed limits, temperature and/or humidity limits, power characteristics and/or limits, default initialization settings, etc.), etc. Accordingly, such properties may be utilized to uniquely identify each of devices 206A-206N, and therefore, be utilized to verify that such devices 206A-206N are coupled to baseboard management controller 202. Configuration registers may also comprise error registers that store values indicative of whether an associated device has incurred an error, fault, and/or failure. Configuration schema 204' may also specify the addresses of such error registers.

Configuration process 216 may utilize such properties to populate sensor data record 218. Configuration process 216 also populates sensor data record 218 with information included in configuration schema 204' (e.g., the logical address at which each device 206A-206N is located, a physical address at which each of devices 206A-206N is located, logical addresses of the configuration registers associated with each device 206A-206N, a communication protocol utilized by each device 206A-206N, etc.). Accordingly, sensor data record 218 comprises a complete listing of device 206A-206N that are to be monitored by baseboard management controller 202, along with the properties associated therewith.

Configuration schema 204' may also specifies one or more fan algorithms and/or power management policies that are specific to the configuration of the computing device being monitored by baseboard management controller 202. The fan algorithms and/or power policies may specify how certain devices of devices 206A-206N (e.g., fans, power supplies) are to be controlled based on certain factors, such as measured temperature, humidity, and/or power readings. Upon successful verification of devices 206A-206N, configuration process 216 may store such fan algorithms and/or power policies in memory 210 (shown as fan algorithm(s) 220 and power policies 222, respectively).

Device monitor 226 may be configured to monitor devices 206A-206B in accordance with the information stored in sensor data record 218. For instance, device monitor 226 may be configured to read certain configuration registers of devices 206A-206N specified by sensor data record 218 that store operational parameters of such devices 206A-206N (e.g., the current temperature, the current humidity, etc.) and/or values indicative of whether devices 206A-206N have incurred an error, fault, and/or failure (i.e., the error registers). If the operational parameters are not within a predetermined threshold (e.g., the temperature is too high, is too much power being consumed, etc.) and/or the error registers indicate that an error, fault, and/or failure has occurred, device monitor 226 may log an event in system event log 228. The event may also specify the physical location at which the malfunctioning device is located. In this way, a service technician may easily locate and service the device.

Device monitor 226 may also cause baseboard management controller 202 to perform a remedial action. For instance, device monitor 226 may provide a command to diagnostics process 224. Diagnostics process 224 may issue a command to one or more of device 206A-206N to remediate the issue exhibited by the computing device being monitored. For instance, diagnostics process 224 may cause processor 208 to issue a command to a fan to change its fan speed (e.g., in accordance with fan algorithm(s) 220), may cause processor 208 to issue a command to device of devices 206A-206N to control its power consumption scheme (e.g., in accordance with power policies 222), may cause processor 208 to issue a command to restart a device of devices 206A-206N, etc.

Figure 3:
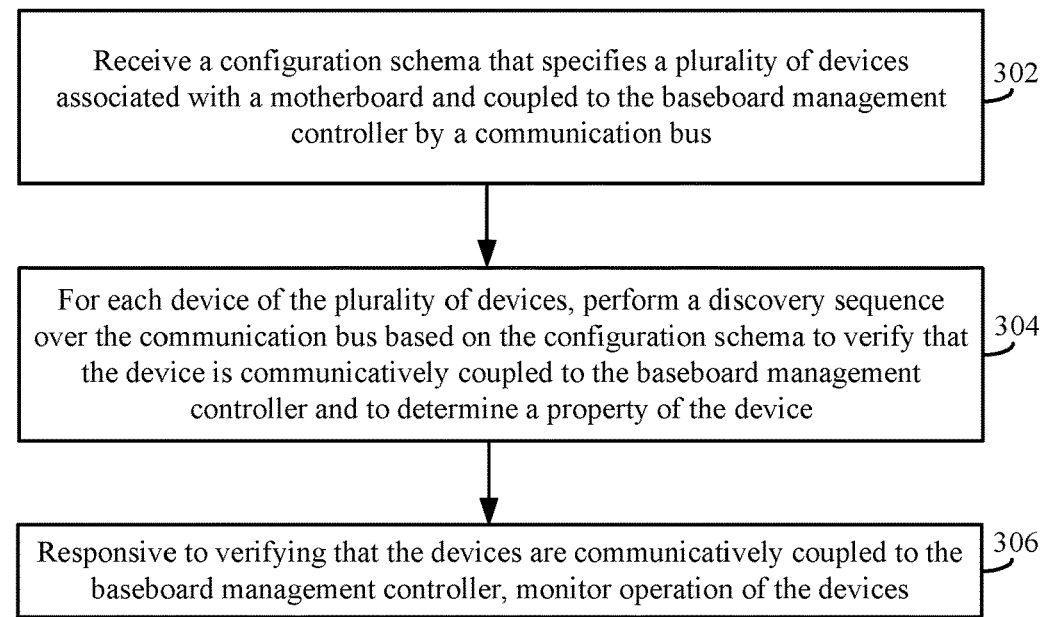
FIG. 3 shows a flowchart of a method for configuring a baseboard management controller to monitor a plurality of devices in accordance with an example embodiment.
Figure 4:
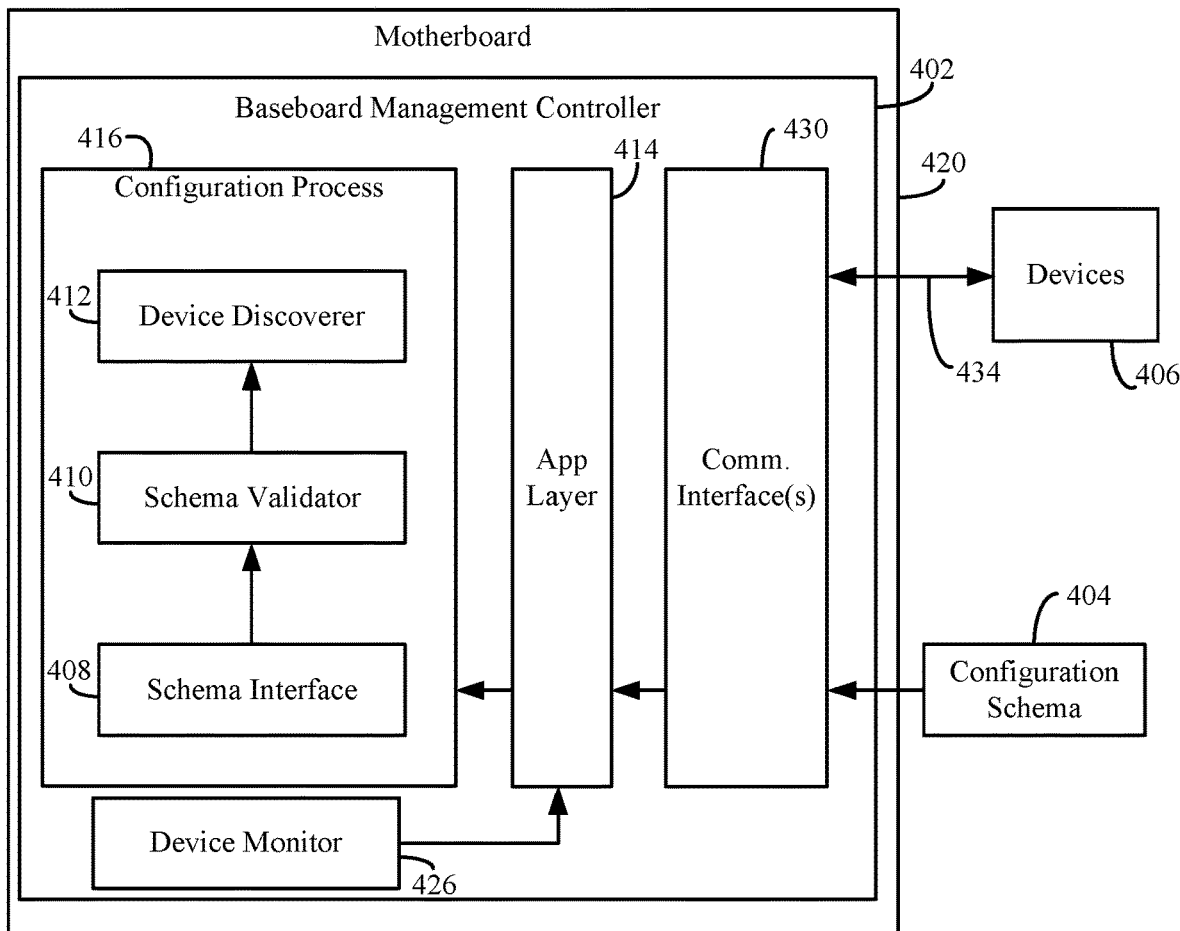
FIG. 4 shows a block diagram of a system for configuring a baseboard management controller mounted to a motherboard in accordance with an example embodiment

Accordingly, in example embodiments, a baseboard management controller may be configured to monitor a plurality of devices in various ways. For instance, FIG. 3 shows a flowchart 300 of a method for configuring a baseboard management controller to monitor a plurality of devices in accordance with an example embodiment. In an embodiment, flowchart 300 may be implemented by a system 400 shown in FIG. 4, although the method is not limited to that implementation. FIG. 4 shows a block diagram of system 400 for configuring a baseboard management controller 402 mounted to a motherboard 420 in accordance with an example embodiment. As shown in FIG. 4, system 400 comprises baseboard management controller 402 and a plurality of devices 406. Baseboard management controller 402 and devices 406 are examples of baseboard management controller 202 and devices 206A-206N, as described above with reference to FIG. 2. Baseboard management controller 402 is mounted on motherboard 420. As further shown in FIG. 4, baseboard management controller 402 comprises a configuration process 416, an application layer 414, a device monitor 426, and one or more communication interfaces 430, which are examples of configuration process 216, application layer 214, device monitor 226, and communication interface(s) 230, as respectively described above with reference to FIG. 2. Configuration process 416 may include a schema interface 408, a schema validator 410, and a device discoverer 412. Configuration process 416, device monitor 426 and application layer 414 may be stored in a memory of baseboard management controller (e.g., memory 210, as shown in FIG. 2). Baseboard management controller 402 may be communicatively coupled to devices 406 via a communication bus 434. Examples of communication bus 434 includes, but are not limited to, an SMBus, a PMBus, an I2C bus, an MCTP-based bus, and/or the like. Other structural and operational embodiments will be apparent to persons skilled in the relevant art(s) based on the discussion regarding flowchart 300 and system 400 of FIG. 4.

Flowchart 300 begins with step 302. In step 302, a configuration schema is received that specifies a plurality of devices associated with the motherboard and coupled to the baseboard management controller by a communication bus. For example, with reference to FIG. 4, baseboard management controller 420 receives a configuration schema 404 via communication interface(s) 430 (e.g., from an administrator of system 400 using a computer, from a computer according to a management process, etc.) and stores configuration schema 404 in a memory (e.g., memory 210, as shown in FIG. 2) of baseboard management controller 402. Configuration schema 404 is received by schema interface 408 of configuration process 416 via application layer 414. Configuration schema 404 specifies devices 406 that are associated with motherboard 420 and coupled to baseboard management controller 402 by communication bus 434. Configuration schema 404 is an example configuration schema 204, as described above with reference to FIG. 2. Devices 406 may be attached to motherboard 420 and/or may be attached to another circuit board communicatively coupled to motherboard 420.

In accordance with one or more embodiments, the plurality of devices comprises at least one of a temperature sensor, a humidity sensor, a fan, a power supply unit, a memory device, a central processor unit, or a hardware accelerator.

In accordance with one or more embodiments, the configuration schema is in accordance with a JSON format. For example, with reference to FIG. 4, configuration schema 404 is in accordance with a JSON format.

In accordance with one or more embodiments, the baseboard management controller is configured to determine that a digital signature associated with the configuration schema is valid and determine whether the configuration schema is formatted in accordance with a predetermined formatting scheme. For example, with reference to FIG. 4, schema interface 408 may provide configuration schema 404 to schema validator 410. Schema validator 410 may determine that a digital signature associated with configuration schema 404 is valid and determining whether configuration schema 404 is formatted in accordance with a predetermined formatting scheme (e.g., a JSON format). In the event that schema validator 410 determines that the digital signature is invalid and/or configuration schema 404 is not formatted properly, schema validator 410 may log an error (e.g., in system event log 228, as shown in FIG. 2).

In step 304, for each device of the plurality of devices, a discovery sequence is performed over the communication bus based on the configuration schema to verify that the device is communicatively coupled to the baseboard management controller and to determine a property of the device. For example, with reference to FIG. 4, responsive to schema validator 410 determining that the digital signature is valid and configuration schema 404 being formatted properly, schema validator 410 may provide configuration schema 404 to device discoverer 412. Device discoverer 412 may perform a discovery sequence over communication bus 434 based on configuration schema 404 to verify that each of devices 406 are coupled to baseboard management controller 402 and to determine a property of the device. Additional details regarding the discovery sequence is described below with reference to FIGS. 5 and 6.

In step 306, responsive to verifying that the devices are communicatively coupled to the baseboard management controller, operation of the devices is monitored. For example, with reference to FIG. 4, device monitor 426 monitors operation of devices 406 responsive to device discoverer 412 verifying that devices 406 are communicatively coupled to baseboard management controller 402.

In accordance with one or more embodiments, the configuration schema further specifies at least one of, for each device of the plurality of devices, an address at which the device is located, an address at which one or more configuration registers of the device is located, an expected value for each of the one or more configuration registers, a communication protocol utilized by the device, or a physical location at which the device is located.

Figure 5:
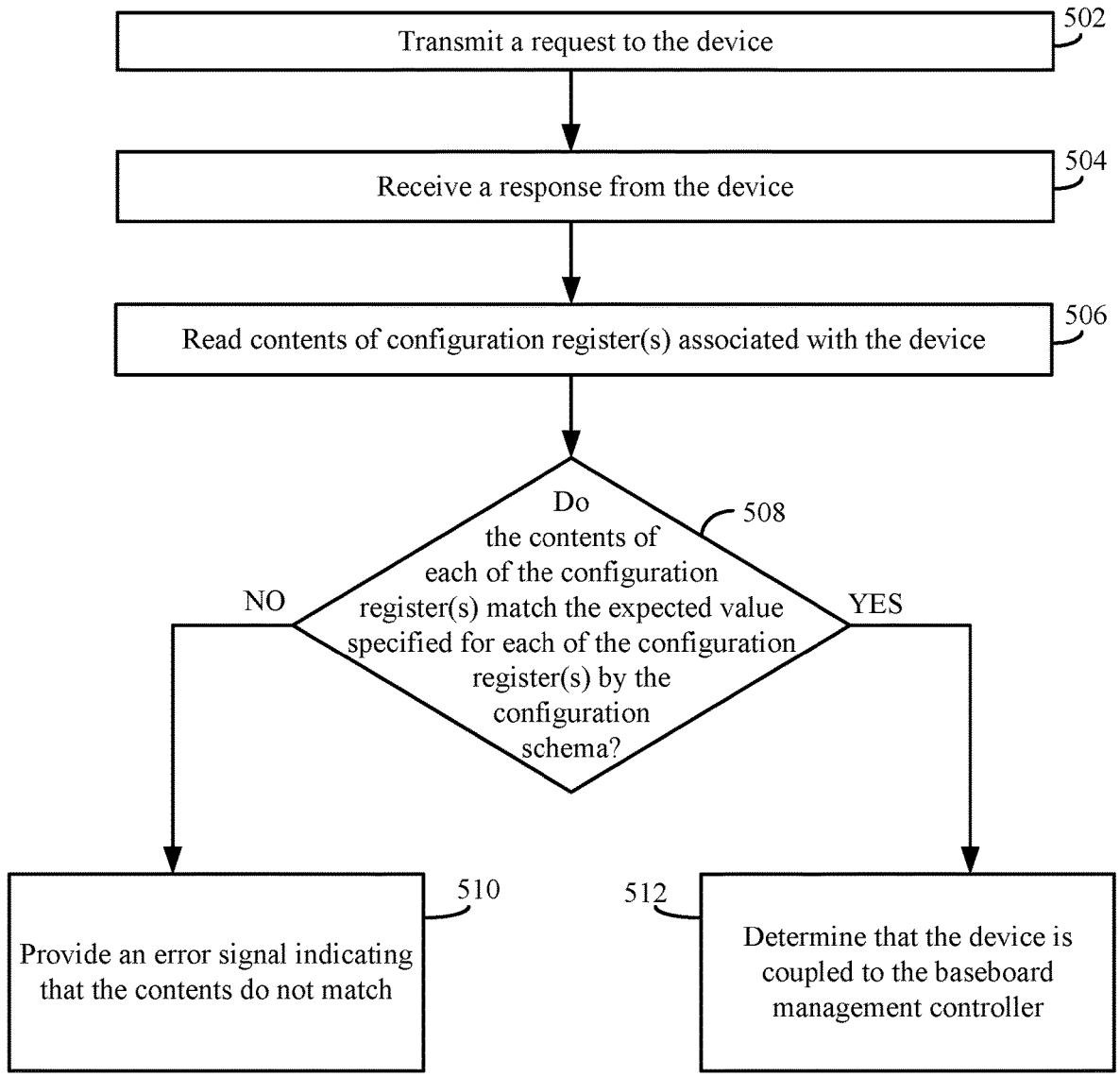
FIG. 5 shows a flowchart of a method for performing a discovery sequence in accordance with an example embodiment.
Figure 6:
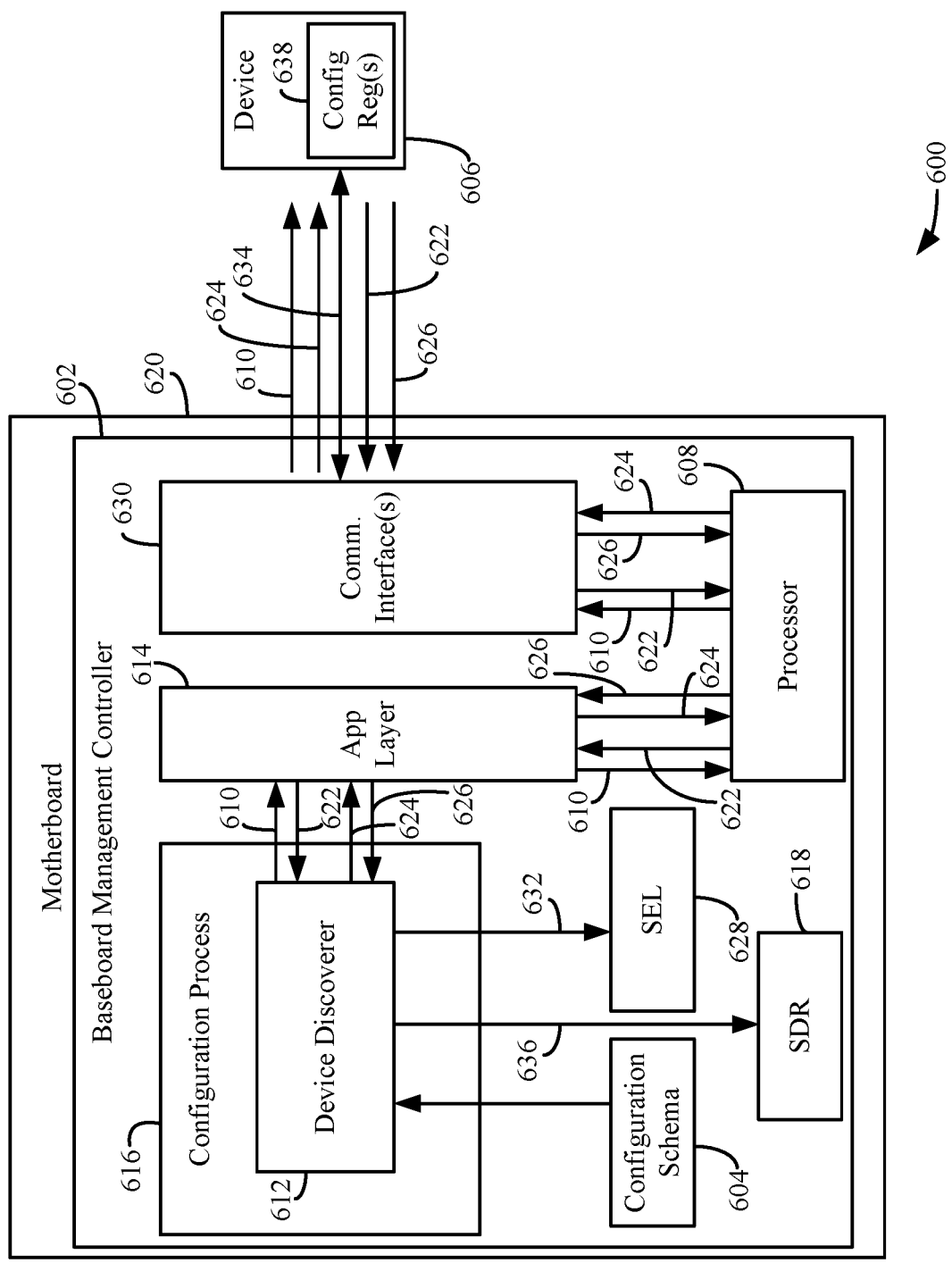
FIG. 6 shows a block diagram of a system for performing a discovery sequence in accordance with an example embodiment.

FIG. 5 shows a flowchart 500 of a method for performing a discovery sequence in accordance with an example embodiment. In an embodiment, flowchart 500 may be implemented by a system 600 shown in FIG. 6, although the method is not limited to that implementation. FIG. 6 shows a block diagram of system 600 for performing a discovery sequence in accordance with an example embodiment. As shown in FIG. 6, system 600 comprises baseboard management controller 602 and a device 606. Baseboard management controller 602 and device 606 are examples of baseboard management controller 402 and devices 406, as respectively described above with reference to FIG. 4. Baseboard management controller 602 is mounted on a motherboard 620. Device 606 may be attached to motherboard 620 and/or may be attached to another circuit board communicatively coupled to motherboard 620. As further shown in FIG. 6, baseboard management controller 602 comprises a configuration process 616, an application layer 614, and one or more communication interfaces 630, which are examples of configuration process 416, application layer 414, and communication interface(s) 430, as respectively described above with reference to FIG. 4, and a processor 608, a system event log 628 and a sensor data record 618, which are examples of processor 208, system event logic 228 and sensor data record 218, as respectively described above with reference to FIG. 2. Configuration process 616 may include a device discoverer 612, which is an example of device discoverer 412, as described above with reference to FIG. 4. Configuration process 616, application layer 414, system event log 628, and sensor data record 618 may be stored in a memory of baseboard management controller 602 (e.g., memory 210, as shown in FIG. 2). As further shown in FIG. 6, configuration schema 604 has been provided to baseboard management controller 602 and stored thereon in the memory of baseboard management controller 602. Baseboard management controller 602 may be communicatively coupled to a device 606 via a communication bus 634. Device 606 may include one or more configuration registers 638. Communication bus 634 is an example of communication bus 434, as described above with reference to FIG. 4.

It is noted that baseboard management controller 602 may perform a discovery sequence with respect to any number of devices. However, FIG. 6 depicts a discovery sequence with respect to a single device (i.e., device 606) for the sake of brevity. Other structural and operational embodiments will be apparent to persons skilled in the relevant art(s) based on the discussion regarding flowchart 500 and system 600 of FIG. 6.

Flowchart 500 begins with step 502. In step 502, a request is transmitted to the device. For example, with reference to FIG. 6, device discoverer 612 may read configuration schema 604 to determine an address at which device 606 is located and issues a request 610 (e.g., a "ping") to device 606. Request 610 is provided to application layer 614, which causes processor 608 to issue request 610 via communication interface(s) 630. Communication interface(s) 630 provides request 610 to device 606 via communication bus 634.

In step 504, a response is received from the device. For instance, with reference to FIG. 6, device 606 provides a response 622 to communication interface(s) 630 via communication bus 634. Communication interface(s) 630 provide response 622 to processor 608, which provides response 622 to device discoverer 612 via application layer 614. It is noted that if response 622 is not received (e.g., after a predetermined period of time), device discoverer 612 may log an error in system error log 628.

In step 506, responsive to receiving the response from the device, contents of configuration register(s) associated with the device are read. For example, with reference to FIG. 6, device discoverer 612 may read configuration schema 604 and determine address(es) for configuration register(s) 638 of device 606. Device discoverer 612 may issue a read request 624 to configuration register(s) 638 using the address(es). Read request 624 may be provided to application layer 614, which causes processor 608 to issue read request 624 via communication interface(s) 630. Communication interface(s) 630 may provide read request 624 via communication bus 634. In response, device 606 may issue a response 626 including the contents of configuration register(s) 638. Response 626 may be provided to communication interface(s) 630 via communication bus 634. Communication interface(s) 630 may provide response 626 to processor 608, which provides response 626 to device discoverer 612 via application layer 614.

In step 508, a determination is made as to whether the contents of each of the configuration register(s) match the expected value specified for each of the configuration register(s) by the configuration schema. For example, with reference to FIG. 6, device discoverer 612 determines whether the contents of configuration register(s) 638 received via response 626 match the expected value specified for each of configuration register(s) 638, as specified by configuration schema 604. If a determination is made that the contents do not match the expected values, flow continues to step 510. Otherwise, flow continues to step 512.

In accordance with one or more embodiments, the contents of the configuration register(s) of the device specify the property of the device. For example, with reference with FIG. 6, the contents of configuration register(s) 638 of device 606 specify the property of device 606.

In step 510, an error signal is provided indication that the contents do not match. For example, with reference to FIG. 6, device discoverer 612 may issue an error signal 628, which is logged in system error log 628.

In step 512, a determination is made that the device is coupled to the baseboard management controller. For example, with reference to FIG. 6, device discoverer 612 determines that device 606 is coupled to baseboard management controller 602.

In accordance with one or more embodiments, the contents of the configuration register(s) (shown as contents 636) are stored in a sensor data record of the baseboard management controller. For example, with reference to FIG. 6, the contents of configuration register(s) 638 received via response 626 are stored in sensor data record 618.

III. Example Baseboard Management Controller Implementation

Figure 7:
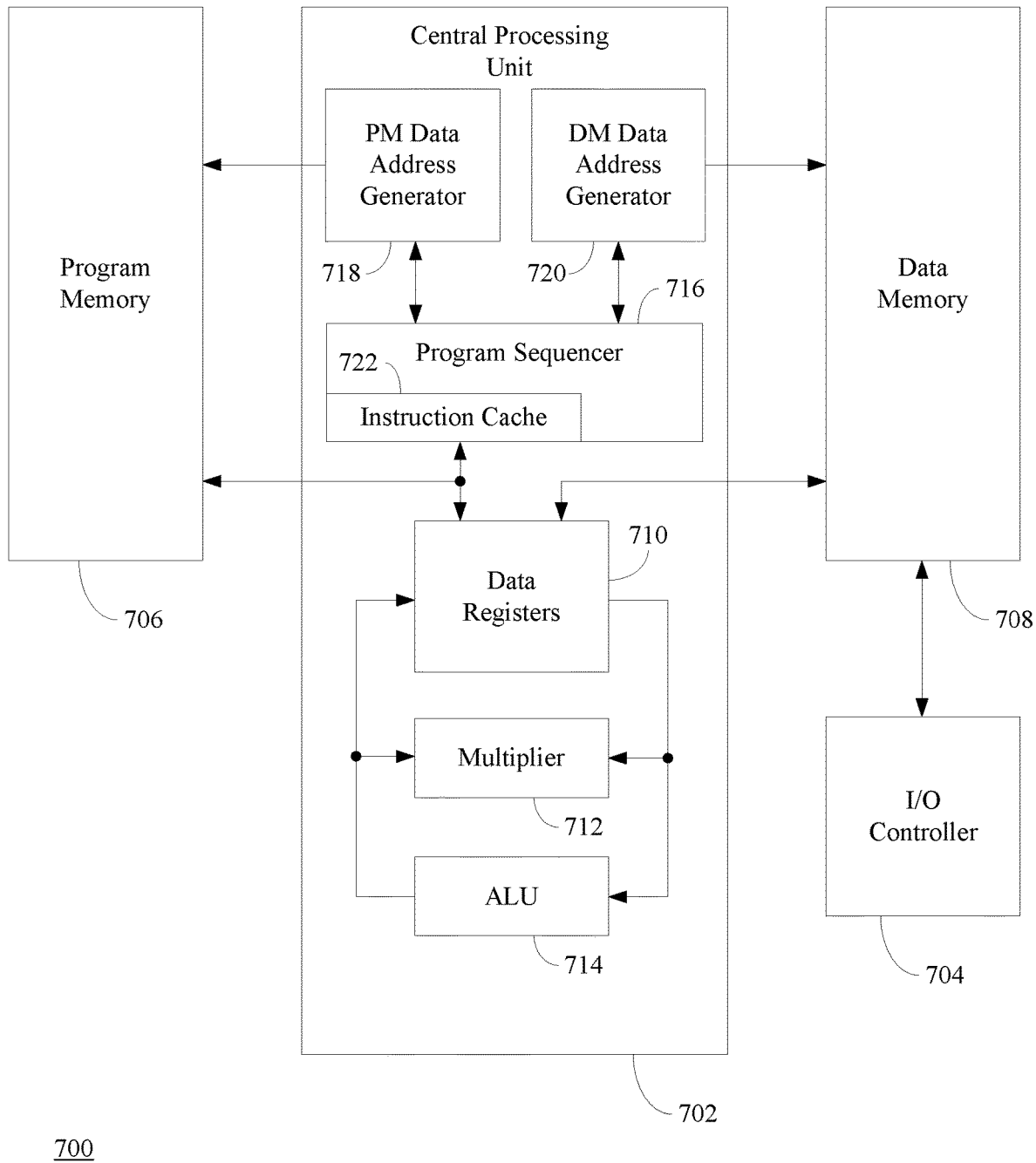
FIG. 7 depicts a block diagram of a processor that may be configured to perform techniques disclosed herein.

FIG. 7 depicts a block diagram of a processor (or controller) device 700 in which baseboard management controller 102, baseboard management controller 202, baseboard management controller 402, baseboard management controller 602 (and/or the components described therein (e.g., processor 208, communication interface(s) 230, memory 210, operating system 212, application layer 214, device monitor 226, power policies 222, sensor data record 218, fan algorithm(s) 220, diagnostics process 224, system even log 228, and/or configuration process 216, as shown in FIG. 1, communication interface 420, application layer 414, configuration process 416, device discoverer 412, schema validator 410, schema interface 408, and/or device monitor 426, as shown in FIG. 4, communication interface(s) 630, application layer 614, sensor data record 618, system event log 632, configuration process 616, device discoverer and/or processor 608, as shown in FIG. 6), and/or any of the steps of any of the flowcharts of FIGS. 3 and 5 may be implemented.

Processor 700 may include central processing unit (CPU) 802 (which may be an example of processor 208 and/or processor 608), an I/O controller 704, a program memory 706, and a data memory 708 (program memory 706 and/or data memory 708 may be examples of memory 210). CPU 702 may be configured to perform the main computation and data processing function of processor 700. I/O controller 704 (which may be an example of communication interface(s) 230, communication interface(s) 430, and/or communication interface(s) 630) may be configured to control communication to external devices via one or more serial ports and/or one or more link ports. For example, I/O controller 704 may be configured to provide data read from data memory 708 to one or more external devices and/or store data received from external device(s) into data memory 708. Program memory 706 may be configured to store program instructions used to process data. Data memory 708 may be configured to store the data to be processed.

Processor 700 further includes one or more data registers 710, a multiplier 712, and/or an arithmetic logic unit (ALU) 714. Data register(s) 710 may be configured to store data for intermediate calculations, prepare data to be processed by CPU 702, serve as a buffer for data transfer, hold flags for program control, etc. Multiplier 712 may be configured to receive data stored in data register(s) 710, multiply the data, and store the result into data register(s) 710 and/or data memory 708. ALU 714 may be configured to perform addition, subtraction, absolute value operations, logical operations (AND, OR, XOR, NOT, etc.), shifting operations, conversion between fixed and floating point formats, and/or the like.

CPU 702 further includes a program sequencer 716, a program memory (PM) data address generator 718, a data memory (DM) data address generator 720. Program sequencer 716 may be configured to manage program structure and program flow by generating an address of an instruction to be fetched from program memory 706. Program sequencer 716 may also be configured to fetch instruction(s) from instruction cache 722, which may store an N number of recently-executed instructions, where N is a positive integer. PM data address generator 718 may be configured to supply one or more addresses to program memory 706, which specify where the data is to be read from or written to in program memory 706. DM data address generator 720 may be configured to supply address(es) to data memory 708, which specify where the data is to be read from or written to in data memory 708.

IV. Further Example Embodiments

Techniques, including methods, described herein may be implemented by hardware (digital and/or analog) or a combination of hardware with software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processors, causes a device to operate as described herein. Devices in which embodiments may be implemented may include storage, such as storage drives, memory devices, and further types of computer-readable storage media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as signals transmitted over wires. Embodiments are also directed to such communication media.

V. Additional Example Embodiments

A method implemented by a baseboard management controller mounted to a motherboard. The method includes: receiving a configuration schema that specifies a plurality of devices associated with the motherboard and coupled to the baseboard management controller by a communication bus; for each device of the plurality of devices, performing a discovery sequence over the communication bus based on the configuration schema to verify that the device is communicatively coupled to the baseboard management controller and to determine a property of the device; and responsive to verifying that the devices are communicatively coupled to the baseboard management controller, monitoring operation of the devices.

In one implementation of the foregoing method, said receiving comprises: determining that a digital signature associated with the configuration schema is valid; and determining whether the configuration schema is formatted in accordance with a predetermined formatting scheme.

In another implementation of the foregoing method, the configuration schema further specifies, for each device of the plurality of devices, at least one of: an address at which the device is located; an address at which one or more configuration registers of the device is located; an expected value for each of the one or more configuration registers; a communication protocol utilized by the device; or a physical location at which the device is located.

In another implementation of the foregoing method, said performing comprises: for each device of the plurality of devices: transmitting a request to the device; receiving a response from the device; responsive to receiving the response from the device, reading contents of one or more configuration registers associated with the device; determining whether the contents of each of the one or more configuration registers match the expected value specified for each of the one or more configuration registers by the configuration schema; in response to determining that the content match, determining that the device is coupled to the baseboard management controller; and in response to determining that the contents do not match, providing an error signal indicating that the contents do not match.

In another implementation of the foregoing method, the contents of the one or more configuration registers of the device specify the property of the device.

In another implementation of the foregoing method, the method further comprises: storing the contents of the one or more configuration registers in a sensor data record of the baseboard management controller.

In another implementation of the foregoing method, the configuration schema is in accordance with a JavaScript Object Notation (JSON) format.

In another implementation of the foregoing method, the plurality of devices comprises at least one of: a temperature sensor; a humidity sensor; a fan; a power supply unit; a memory device; a central processor unit; a hardware accelerator; a storage device; a storage controller; or a network controller.

A baseboard management controller is also described herein. The baseboard management controller includes: a schema interface for receiving a configuration schema that specifies a plurality of devices coupled to the baseboard management controller; a device discoverer configured to: for each device of the plurality of devices, perform a discovery sequence based on the configuration schema to verify that the device is coupled to the baseboard management controller and to determine a property of the device; and a device monitor configured to: responsive to verifying that the devices are coupled to the baseboard management controller, monitor operation of the devices.

In one implementation of the foregoing baseboard management controller, the baseboard management controller further comprises: a schema validator configured to: determine that a digital signature associated with the configuration schema is valid; and determine whether the configuration schema is formatted in accordance with a predetermined formatting scheme.

In another implementation of the foregoing baseboard management controller, the configuration schema further specifies, for each device of the plurality of devices, at least one of: an address at which the device is located; an address at which one or more configuration registers of the device is located; an expected value for each of the one or more configuration registers; a communication protocol utilized by the device; or a physical location at which the device is located.

In another implementation of the foregoing baseboard management controller, the device discoverer is further configured to: for each device of the plurality of devices: transmit a request to the device; receive a response from the device; responsive to receiving the response from the device, read contents of one or more configuration registers associated with the device; determine whether the contents of each of the one or more configuration registers match the expected value specified for each of the one or more configuration registers by the configuration schema; in response to determining that the content match, determine that the device is coupled to the baseboard management controller; and in response to determining that the contents do not match, provide an error signal indicating that the contents do not match.

In another implementation of the foregoing baseboard management controller, the contents of the one or more configuration registers of the device specify the property of the device.

In another implementation of the foregoing baseboard management controller, the baseboard management controller further comprises: a sensor data record, wherein the device discoverer is configured to store the contents of the one or more configuration registers in the sensor data record.

In another implementation of the foregoing baseboard management controller, the configuration schema is in accordance with a JavaScript Object Notation (JSON) format.

In another implementation of the foregoing baseboard management controller, the plurality of devices comprises at least one of: a temperature sensor; a humidity sensor; a fan; a power supply unit; a memory device; a central processor unit; a hardware accelerator; a storage device; a storage controller; or a network controller.

A controller device is also described herein. The controller devices includes: an interface for receiving a configuration schema that specifies a plurality of devices coupled to the controller device; at least one processor circuit; and at least one memory that stores program code configured to be executed by the at least one processor circuit, the program code comprising: a device discoverer configured to: for each device of the plurality of devices, perform a discovery sequence based on the configuration schema to verify that the device is coupled to the controller device and to determine a property of the device; and device monitor configured to: responsive to verifying that the devices are coupled to the controller device, monitor operation of the devices.

In one implementation of the foregoing controller device, the program code further comprises: a schema validator configured to: determine that a digital signature associated with the configuration schema is valid; and determine whether the configuration schema is formatted in accordance with a predetermined formatting scheme.

In one implementation of the foregoing controller device, the configuration schema further specifies, for each device of the plurality of devices, at least one of: an address at which the device is located; an address at which one or more configuration registers of the device is located; an expected value for each of the one or more configuration registers; a communication protocol utilized by the device; or a physical location at which the device is located.

In another implementation of the foregoing controller device, the configuration schema further specifies at least one of: for each device of the plurality of devices: an address at which the device is located; an address at which one or more configuration registers of the device is located; an expected value for each of the one or more configuration registers; a communication protocol utilized by the device; or a physical location at which the device is located.

In another implementation of the foregoing controller device, the device discoverer is further configured to: for each device of the plurality of devices: transmit a request to the device; receive a response from the device; responsive to receiving the response from the device, read contents of one or more configuration registers associated with the device; determine whether the contents of each of the one or more configuration registers match the expected value specified for each of the one or more configuration registers by the configuration schema; in response to determining that the content match, determine that the device is coupled to the controller device; and in response to determining that the contents do not match, provide an error signal indicating that the contents do not match.

VI. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the present invention should not be limited by any of the above-described example embodiments, but should be defined only in accordance with the following claims and their equivalents.

What is claimed is:

1. A baseboard management controller (BMC) mounted to a motherboard of a computing device, comprising:
  a schema validator configured to validate a configuration schema that specifies a plurality of devices associated with the motherboard and coupled to the BMC by a communication bus;
  a device discoverer configured to:
    perform a discovery sequence over the communication bus based on the configuration schema to verify the plurality of devices, including for a first device of the devices at least:
      issuing a request to the first device according to a communication protocol and at an address indicated for the device in the configuration schema; and
      waiting for a response to the request; and
    responsive to the discovery sequence being unsuccessful with respect to the first device due to a failure to receive a response to the request from the first device, issue an error.

2. A baseboard management controller (BMC) mounted to a motherboard of a computing device, comprising:
  a schema validator configured to validate a configuration schema that specifies a plurality of devices associated with the motherboard and coupled to the BMC by a communication bus;
  a device discoverer configured to:
    perform a discovery sequence over the communication bus based on the configuration schema to verify the plurality of devices, including for a first device of the devices at least:
      issuing a request to the first device according to a communication protocol and at an address indicated for the device in the configuration schema; and
      waiting for a response to the request; and
    responsive to the discovery sequence being unsuccessful with respect to the first device, issue an error, wherein the issued error is configured to cause corrective action to remediate the unsuccessful discovery sequence.

3. The baseboard management controller (BMC) of claim 1, wherein the device discoverer is further configured to:
  responsive to issuing the error, receive an updated configuration schema.

4. The baseboard management controller (BMC) of claim 1, wherein the issued error is configured to log an error in a system error log.

5. The baseboard management controller (BMC) of claim 2, wherein the discovery sequence is unsuccessful due to a failure to receive a response to the request from the first device.

6. The baseboard management controller (BMC) of claim 2, wherein to further perform the discovery sequence, the device discoverer is further configured to:
  receive a response to the request from the first device;
  read contents of one of more configuration registers associated with the first device; and
  determine the contents do not match an expected value specified by the configuration schema; and
  wherein the issued error is configured to indicate the contents do not match.

7. The baseboard management controller (BMC) of claim 1, wherein the issued error is configured to specify a physical location at which a malfunctioning device is located.

8. A baseboard management controller (BMC) mounted to a motherboard of a computing device, comprising:
  a schema validator configured to validate a digital signature associated with a configuration schema that specifies a plurality of devices associated with the motherboard and coupled to the BMC by a communication bus;
  a device discoverer configured to:
    responsive to validation of the digital signature, perform a discovery sequence over the communication bus based on the configuration schema to verify the plurality of devices, including for a first device of the devices at least:
      issuing a request to the first device according to a communication protocol and at an address indicated for the device in the configuration schema; and
      waiting for a response to the request; and
    responsive to the discovery sequence being successful with respect to the devices, monitor operation of the devices.

9. The baseboard management controller (BMC) of claim 8, the schema validator further configured to:
   determine whether the configuration schema is formatted in accordance with a predetermined formatting scheme.

10. The baseboard management controller (BMC) of claim 8, wherein the configuration schema further specifies, for each device of the plurality of devices, at least one of:
   an address at which the device is located;
   an address at which one or more configuration registers of the device is located;
   the expected value for each of the one or more configuration registers;
   a communication protocol utilized by the device; or
   a physical location at which the device is located.

11. The baseboard management controller (BMC) of claim 10, further comprising:
   a sensor data record,
   wherein the device discoverer is configured to store contents of the one or more configuration registers in the sensor data record.

12. The baseboard management controller (BMC) of claim 11, wherein the BMC further comprises a device monitor configured to monitor devices in accordance with information stored in the sensor data record.

13. The baseboard management controller (BMC) of claim 8, wherein the configuration schema is in accordance with a JavaScript Object Notation (JSON) format.

14. A method implemented by a baseboard management controller (BMC) mounted to a motherboard of a computing device, the method comprising:
   validating a digital signature associated with a configuration schema that specifies a plurality of devices associated with the motherboard and coupled to the BMC by a communication bus;
   responsive said validating the digital signature, performing a discovery sequence over the communication bus based on the configuration schema to verify the plurality of devices, including for a first device of the devices at least:
      issuing a request to the first device according to a communication protocol and at an address indicated for the device in the configuration schema; and
      waiting for a response to the request; and
   responsive to the discovery sequence being unsuccessful with respect to the first device, issuing an error.

15. The method of claim 14, wherein said issuing an error comprises causing corrective action to remediate the unsuccessful discovery sequence.

16. The method of claim 14, further comprising:
   responsive to said issuing the error, receiving an updated configuration schema.

17. The method of claim 14, wherein said issuing an error comprises logging an error in a system error log.

18. The method of claim 14, wherein said performing a discovery sequence further includes for the first device:
   failing to receive a response to the request from the first device.

19. The method of claim 14, wherein said performing a discovery sequence further includes:
   receiving a response to the request from the first device;
   reading contents of one or more configuration registers associated with the first device; and
   determining the contents do not match an expected value specified by the configuration schema; and
   wherein said issuing an error comprises providing an indication the contents do not match.

20. The method of claim 14, wherein said issuing an error comprises:
   issuing an error that specifies a physical location at which a malfunctioning device is located.

21. A method implemented by a baseboard management controller (BMC) mounted to a motherboard of a computing device, the method comprising:
   validating a configuration schema that specifies a plurality of devices associated with the motherboard and coupled to the BMC by a communication bus;
   performing a discovery sequence over the communication bus based on the configuration schema to verify the plurality of devices, including for a first device of the devices at least:
      issuing a request to the first device according to a communication protocol and at an address indicated for the device in the configuration schema; and
      waiting for a response to the request; and
   responsive to the discovery sequence being unsuccessful with respect to the first device, issuing an error by:
      causing corrective action to remediate the unsuccessful discovery sequence,
      logging the error in a system error log, or
      issuing the error that specifies a physical location at which a malfunctioning device is located.

* * * * *